United States Patent
Ahrens et al.

(10) Patent No.: US 9,202,232 B2
(45) Date of Patent: Dec. 1, 2015

(54) CROSS-SCREEN ADVERTISING CAMPAIGN SEQUENCING

(75) Inventors: Matthew Ahrens, Champaign, IL (US); Greg Muchnik, Champaign, IL (US); Aaron Klish, Savoy, IL (US)

(73) Assignee: Yahoo! Inc., Sunnyvale, CA (US)

( * ) Notice: Subject to any disclaimer, the term of this patent is extended or adjusted under 35 U.S.C. 154(b) by 509 days.

(21) Appl. No.: 13/437,512

(22) Filed: Apr. 2, 2012

(65) Prior Publication Data
US 2013/0262225 A1 Oct. 3, 2013

(51) Int. Cl.
*G06Q 30/00* (2012.01)
*G06Q 30/02* (2012.01)

(52) U.S. Cl.
CPC ........ *G06Q 30/0243* (2013.01); *G06Q 30/0264* (2013.01)

(58) Field of Classification Search
CPC .................................................. G06Q 30/0264
USPC ...................................................... 705/14.61
See application file for complete search history.

(56) References Cited

U.S. PATENT DOCUMENTS

2007/0283268 A1* 12/2007 Berger et al. ................. 715/716

OTHER PUBLICATIONS

Winders, "5 smart ways to use ad networks", iMediaConnection, Oct. 17, 2007, on line at imediaconnection.com.*

* cited by examiner

*Primary Examiner* — John G Weiss
*Assistant Examiner* — Scott C Anderson
(74) *Attorney, Agent, or Firm* — Maurice Kapouytian Woods LLP; Elaine Lee; James Woods

(57) ABSTRACT

The present invention provides techniques for use in electronic and online advertising. Techniques are provided in which an advertiser provides information specifying a time-spaced sequence of advertisements to be targeted and served to a particular user, across a number of different devices and screens. Each advertisement in the sequence may be served to the user while the user is using a particular electronic device. The sequence of advertisements as a whole may be optimized with regard to eliciting a particular response from the user, and each advertisement may be optimized regarding its order in the sequence and the type of device or screen on which it is to be served.

20 Claims, 5 Drawing Sheets

CROSS-SCREEN ADVERTISING CAMPAIGN SEQUENCING

BACKGROUND

Increasingly, a user, such as an online user, may move from device to device, and screen to screen, over time, including a mobile phone, a notebook or tablet computer, a desktop computer, etc.

There is a need for techniques for use in connection with advertising and advertising campaigns, such as techniques in connection with a user who moves between multiple electronic or online devices.

SUMMARY

Some embodiments of the invention provide systems and methods for use in electronic and online advertising. In some embodiments, techniques are provided in which an advertiser provides information specifying a time-spaced sequence of advertisements to be targeted and served to a particular user, across a number of different devices and screens. Each advertisement in the sequence may be served to the user while the user is using a particular electronic device. The sequence of advertisements as a whole may be optimized with regard to eliciting a particular response from the user, and each advertisement may be optimized regarding its order in the sequence and the type of device or screen on which it is to be served.

While the invention is described with reference to the above drawings, the drawings are intended to be illustrative, and the invention contemplates other embodiments within the spirit of the invention.

DETAILED DESCRIPTION

Figure 1:
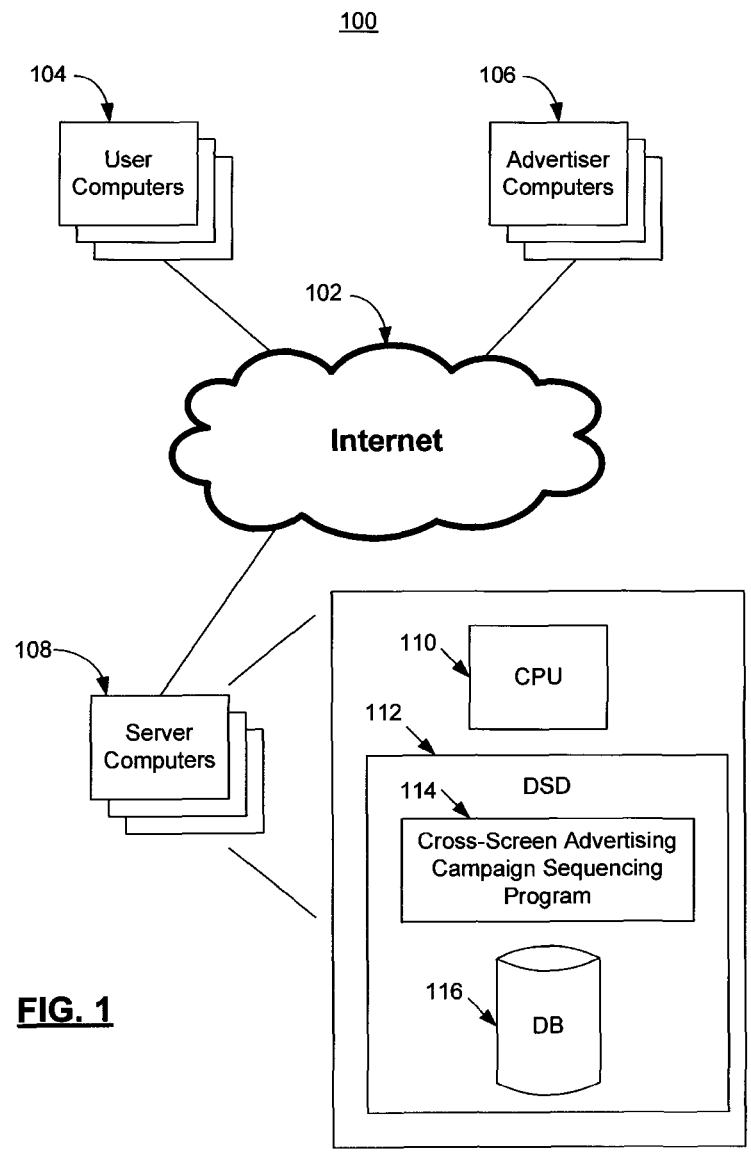
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers or other computers may be or include wireless, portable, or handheld devices such as cell phones, smart phone, PDAs, tablets, etc.

Each of the one or more computers 104, 106, 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, coupon-related advertisements, group-related advertisements, social networking-related advertisements, etc.

As depicted, each of the server computers 108 includes one or more CPUs 110 and a data storage device 112. The data storage device 112 includes a database 116 and a Cross-Screen Advertising Campaign Sequencing Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Figure 2:
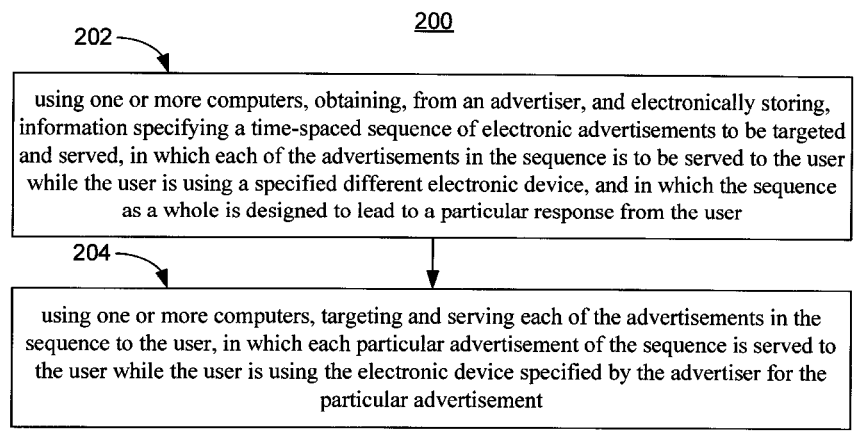
FIG. 2 is a flow diagram illustrating a method according to one embodiment of the invention.

FIG. 2 is a flow diagram illustrating a method 200 according to one embodiment of the invention. Step 202 includes, using one or more computers, obtaining, from an advertiser, and electronically storing, information specifying a time-spaced sequence of electronic advertisements to be targeted and served, in which each of the advertisements in the sequence is to be served to the user while the user is using a specified different electronic device, and in which the sequence as a whole is designed to lead to a particular response from the user.

Step 204 includes, using one or more computers, targeting and serving each of the advertisements in the sequence to the user, in which each particular advertisement of the sequence is served to the user while the user is using the electronic device specified by the advertiser for the particular advertisement.

Figure 3:
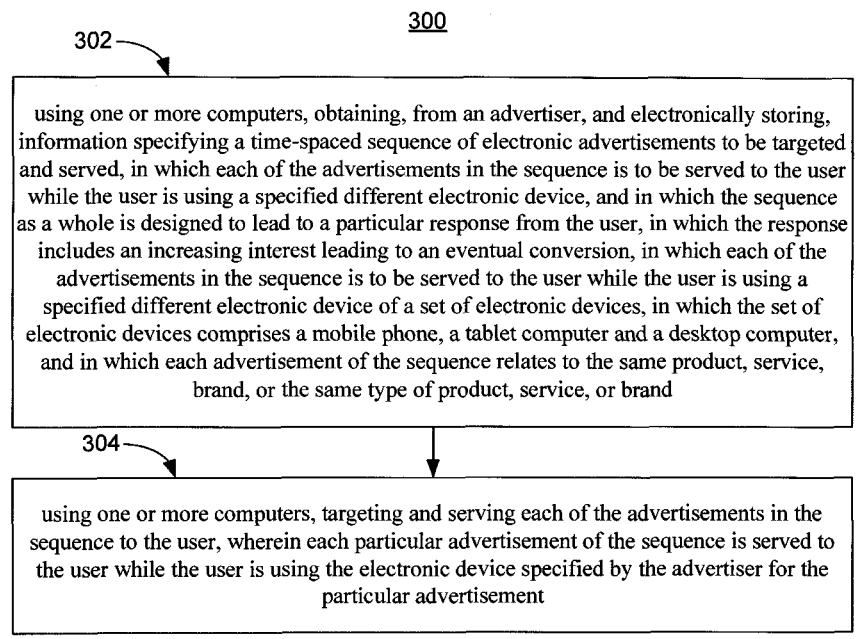
FIG. 3 is a flow diagram illustrating a method according to one embodiment of the invention.

FIG. 3 is a flow diagram illustrating a method 300 according to one embodiment of the invention.

Step 302 includes, using one or more computers, obtaining, from an advertiser, and electronically storing, information specifying a time-spaced sequence of electronic advertisements to be targeted and served, in which each of the advertisements in the sequence is to be served to the user while the user is using a specified different electronic device, and in which the sequence as a whole is designed to lead to a particular response from the user. The response includes an increasing interest leading to an eventual conversion. Each of the advertisements in the sequence is to be served to the user while the user is using a specified different electronic device of a set of electronic devices. The set of electronic devices comprises a mobile phone, a tablet computer and a desktop computer. Each advertisement of the sequence relates to the same product, service, brand, or the same type of product, service, or brand.

Figure 4:
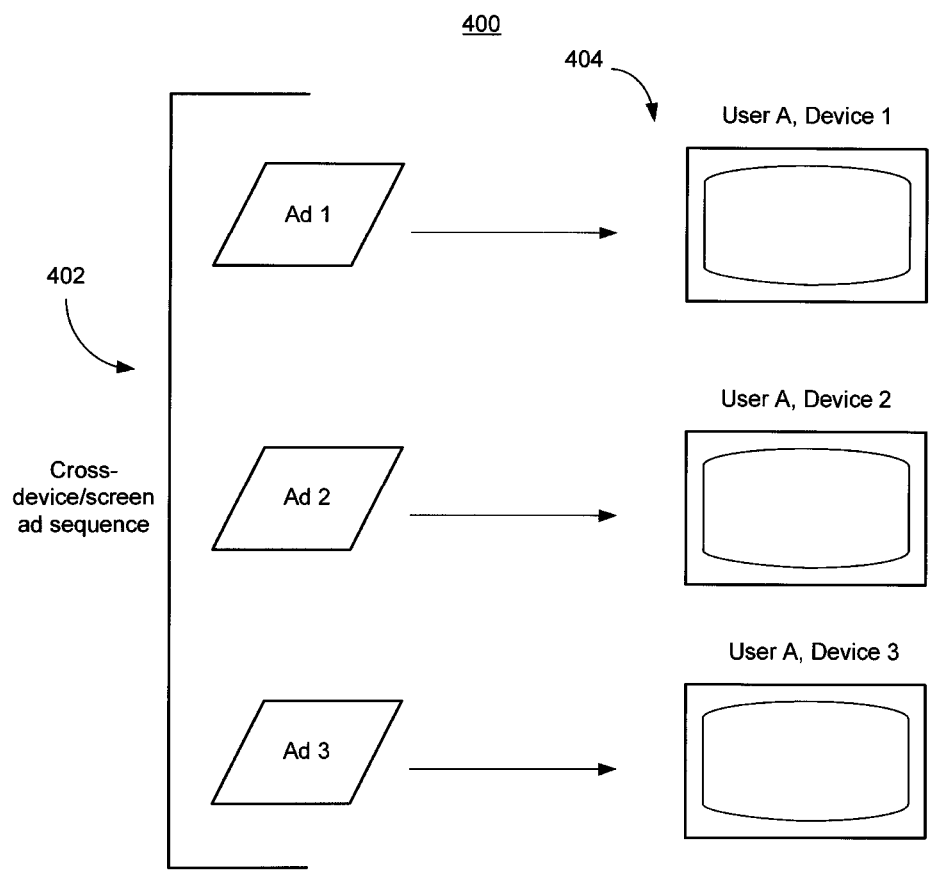
FIG. 4 is a block diagram illustrating one embodiment of the invention.

FIG. 4 is a block diagram 400 illustrating one embodiment of the invention. Generally, FIG. 4 depicts a cross-device or cross-screen ad sequence 402, including, Ad 1, Ad 2 and Ad 3, targeted and served to a particular user, User A, in which each of the Ads are sequentially delivered to User A on a different device that User A is using at the time of delivery, including Device 1, Device 2, and Device 3. The devices can be wired or wireless electronic devices, including, for example, electronic devices, computerized devices, mobile phones or smart phones, tablet, notebook or other portable computers, desktop computers, etc.

Figure 5:
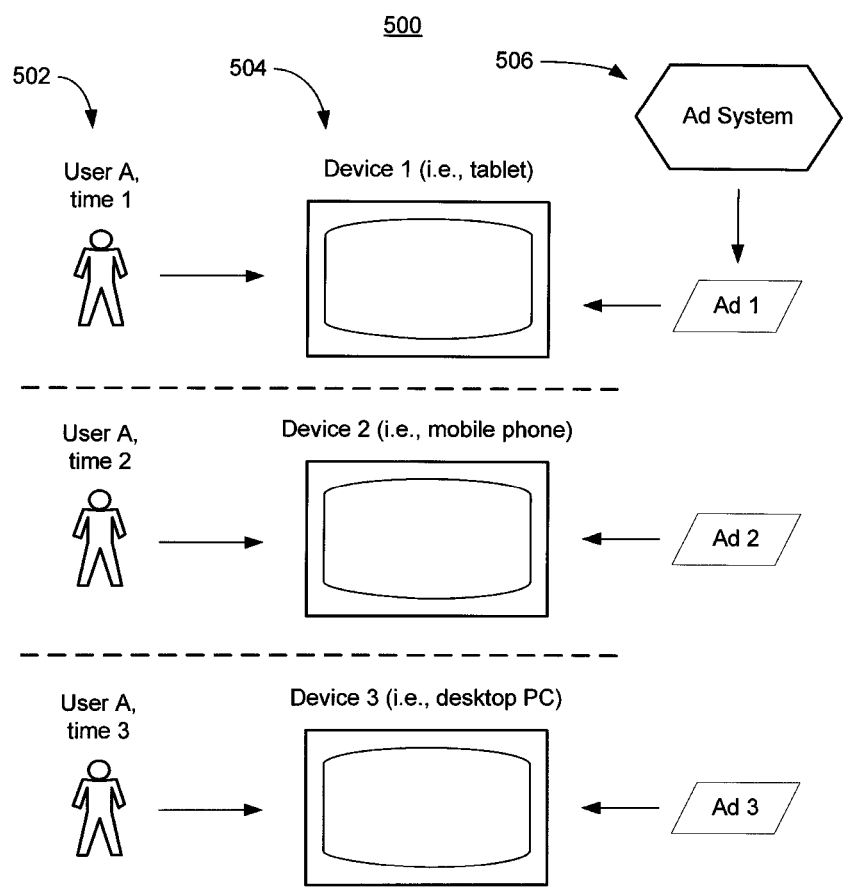
FIG. 5 is a block diagram illustrating one embodiment of the invention.

FIG. 5 is a block diagram 500 illustrating one embodiment of the invention. Generally, FIG. 5 depicts a user, User A 502, targeted with, and served, a time-spaced sequence of ads, Ad 1, Ad 2 and Ad 3, over several different devices and screens 504, including a tablet computer, a mobile phone, and, finally, a desktop computer.

In some embodiments, each advertisement of a sequence may relate to a product, service, or brand, or type of group or related products, services or brands. Furthermore, each or some advertisements of a sequence may be designed to further increase a user's interest, finally leading to conversion, the nature of which conversion can depend on the advertiser's desires, such as a user Web site visit, filling out of an online form, or purchase, for example.

In some embodiments, advertisements in a sequence may be related and may even reference each other or a single subject in some way, to remind the user and increase the unity of the sequence.

In some embodiments, a sequence can include multiple advertisements to each one or more user devices or screens, etc.

Some embodiments of the invention provide methods for cross-device, and cross-screen advertising as part of an advertising campaign. With users seeing different types of ads across different screens (mobile devices, tablets, PCs, etc.), increasingly, advertisers can benefit by creating unique campaigns, or portions of campaigns, that span across devices, and may be triggered or optimized by or relative to various scenarios and conditions involving the different devices and their screens.

An example use case could be an advertiser, advertising for a new car, that wants the first part (or first ad) of a campaign sequence to be shown on a particular user's PC, perhaps with high definition images, then the second part is to be shown on a tablet of the same user, perhaps with images and text, and a third part is then to be shown to the same user via a mobile device, perhaps including a text with specific deal information. Sequencing of a portion of a campaign for an individual user across screens can present a compelling technique for advertisers (where "advertiser" is intended to include advertisers, their agents, proxies, etc.).

Existing technologies may allow an advertiser to target a specific platform or get details on how a campaign or ad works on different devices or screens. Some embodiments of the invention, however, allow customization in which advertisers can specify a sequence across devices to allow them to reach audiences in the particular manner and with the impact that they desire, to take advantage of the distinct canvases that each screen allows, and of the cumulative impact of perhaps different ads across different screens over time.

In some embodiments, a solution includes: (a) a system for tracking a user across screens, (b) an advertising interface for allowing advertisers to specify campaign sequencing, and (c) an ad serving system which can serve an advertisement on a specific screen based at least in part on an advertiser's campaign sequence as well as past advertisement views of the user.

Examples of (a), systems for tracking, can include, among other things, audience segmenting and tracking systems, which may use, for example, browser cookies or logins.

Examples of (b), an advertising interface, could include, among other things, Web sites allowing or dedicated to allowing advertisers setting up campaigns.

Examples of (c), an ad serving system, could include, among other things, front-end ad servers which respond to redirect requests by returning an ad creative or a link to an ad to render. In some embodiments, an ad serving, system can include or be the same as a system for tracking.

The following is an example use case providing an example of an embodiment of the invention.

As a first step or development, an advertiser enters in information regarding a campaign sequence, using an advertising interface, such as specifying a sequence for a new automobile advertising campaign (where a campaign can include any portion of a campaign). The entered sequence information could indicate that the sequence should proceed in the following manner, to a particular user:

i. Tablet advertisement to be served, containing interactive images targeted and served to a particular user;

ii. Mobile phone advertisement to be served, providing a deal offer indicating how much the user can save; and iii. Desktop screen advertisement to be served to the user, including a link to the advertiser's Web site, at which the user will be invited to fill out a form providing information.

The advertiser's strategy may be directed, in the above manner, to first engage the user visually and increase the user's interest, before leading to the user to convert at the advertiser's Web site.

As a second step or development, an ad serving opportunity is detected, for a user visiting a Web site on a tablet computer.

As a third step or development, an ad serving system would detect that the user has not seen any ads yet from the sequence, which may be a condition for serving of the tablet ad, and the system would serve an ad to the user, as indicating in item (i), above.

As a fourth step or development, the user would experience the ad on the tablet.

As a fifth step or development, later, the ad system detects that the user is visiting a Web site on a mobile phone, and an ad serving opportunity is detected.

As a sixth step or development, The ad serving system would detect that the user has been served a the first ad in the sequence, via the tablet, which may be a condition for serving the mobile phone ad, and so would serve a second ad to the user via the mobile phone, as indicated in item (ii), above.

As a seventh step or development, the user would experience the advertisement served to the user's mobile device.

As an eighth step or development, the ad system detects that the user is visiting a Web site on a desktop browser, and detects an ad serving opportunity.

As a ninth step or development, the ad system, the ad serving system detects that the user has experienced the first ad on the tablet and the second ad on the mobile device, which may be conditions for serving of the desktop ad, and so would serve a third advertisement in the sequence to the desktop computer of the user, as indicated in (iii), above.

As a tenth step or development, the user would experience the third ad on the desktop browser.

Some embodiments of the invention incorporate geotargeting elements. For example, in some embodiments, all of the advertisements in a sequence may be subject to the condition that they be served while the user is within a certain geographic area, such as a local area where the user lives or works, or simply is found at, for example. Furthermore, one or more of the advertisements in the sequence may pertain specifically to that local area.

In some embodiments, for example, a variation of a use case could be in part location-based, where a sequence starts with a mobile device ad from a local auto dealer, which may be determined in part by geolocation or GPS relating to the mobile device. The next advertisement on the tablet may, for example, follow up and reference a specific auto model that the local dealer offers. The last ad in the sequence may, for example, be a specific deal that the local auto dealer is offering relating to the model. Such variations may allow for a campaign sequence to take into account locality, to allow, for example, for dynamic advertisements and sequences tailored to a user's geographic location.

Some embodiments of the invention enable ad networks, for example, to provide advertisers with, or allow for, compelling and innovative advertising products, allowing advertisers to take advantage of, and optimize in view of, the multi-screen world that users now live in.

While the invention is described with reference to the above drawings, the drawings are intended to be illustrative, and the invention contemplates other embodiments within the spirit of the invention.

The invention claimed is:

1. A method comprising:
using one or more computers, obtaining, from an advertiser, and electronically storing, information specifying a time-spaced sequence of electronic advertisements to be targeted and served,
wherein each of the advertisements in the sequence is to be served to a user while the user is using a specified different electronic device,
and wherein the sequence as a whole is designed to lead to a particular response from the user;
using one or more computers, storing a set of indicators for the user, where each indicator is associated with a distinct advertisement in the sequence, and the indicator shows that the associated advertisement has been viewed by the user; and
using one or more computers, targeting and serving each of the advertisements in the sequence to the user, wherein each particular advertisement of the sequence is served to the user upon detecting that that the user is using the specified electronic device and the user's indicator associated with the particular advertisement shows that the user has not viewed the particular advertisement, and the particular advertisement is delivered while the user is using the electronic device specified by the advertiser for the particular advertisement.

2. The method of claim 1, comprising targeting and serving each of the advertisements in the sequence to the user, wherein the sequence as a whole is designed by the advertiser to elicit a particular response from the user, and wherein an elicited particular response includes an increasing interest leading to an eventual conversion.

3. The method of claim 1, wherein the sequence of advertisements, and a sequence of devices on which the advertisements are served to the user, are designed to be optimized in terms of eliciting a particular response from the user.

4. The method of claim 1, comprising targeting and serving each of the advertisements in the sequence to the user, wherein the sequence as a whole is designed by the advertiser to elicit a particular response from the user, and wherein a final advertisement in the sequence is intended to directly lead to a conversion.

5. The method of claim 1, wherein each later advertisement in the sequence builds on all previous advertisements in the sequence in terms of preparing for and leading the user to the response.

6. The method of claim 1, wherein each advertisement of the sequence relates to a same product, service, brand, or a same type of product, service, or brand.

7. The method of claim 1, wherein each of the advertisements in the sequence is designed to be performance-optimized at least in part in view of the particular device on which the advertisement is to be served.

8. The method of claim 1, wherein each of the advertisements in the sequence is designed to be performance-optimized at least in part in view of a type of screen or viewable portion of the particular electronic device on which the advertisement is to be served.

9. The method of claim 1, wherein the advertisements are online advertisements.

10. The method of claim 1, wherein each of the advertisements in the sequence is to be served to the user while the user is using a specified different electronic device of a set of electronic devices, and wherein the set of electronic devices comprises a mobile device or a tablet computer.

11. The method of claim 1, wherein each of the advertisements in the sequence is to be served to the user while the user is using a specified different electronic device of a set of electronic devices, and wherein the set of electronic devices comprises a mobile phone, a tablet computer and a desktop computer.

12. The method of claim 1, wherein the sequence of advertisements includes an overall geotargeting aspect.

13. The method of claim 1, wherein the sequence of advertisements includes an overall geotargeting aspect, and wherein each of the advertisements in the sequence is associated with the same or an overlapping geographic area.

14. The method of claim 1, comprising tracking the user using cookie or login information.

15. A system comprising:
one or more server computers coupled to a network; and
one or more databases coupled to the one or more server computers;
wherein the one or more server computers are programmed to:
obtain, from an advertiser, and electronically store, information specifying a time-spaced sequence of electronic advertisements to be targeted and served,
wherein each of the advertisements in the sequence is to be served to a user while the user is using a specified different electronic device,
and wherein the sequence as a whole is designed to lead to a particular response from the user;
store a set of indicators for the user, where each indicator is associated with a distinct advertisement in the sequence, and the indicator shows that the associated advertisement has been viewed by the user; and
target and serve each of the advertisements in the sequence to the user, wherein each particular advertisement of the sequence is served to the user upon detecting that the user is using the specified electronic device and the user's indicator associated with the particular advertisement shows that the user has not viewed the particular advertisement, and delivered while the user is using the electronic device specified by the advertiser for the particular advertisement.

16. The system of claim 15, wherein the electronic advertisements are online advertisements.

17. The system of claim 15, wherein at least one of the one or more server computers are coupled to the Internet.

18. The system of claim 15, comprising targeting and serving each of the advertisements in the sequence to the user, wherein the sequence as a whole is designed by the advertiser to elicit a particular response from the user, and wherein an elicited particular response includes an increasing interest leading to an eventual conversion.

19. The system of claim 15, wherein the sequence of advertisements, and a sequence of devices on which the advertisements are served to the user, are designed to be optimized in terms of eliciting a particular response from the user.

20. A non-transitory computer readable medium or media containing instructions for executing a method comprising:
    using one or more computers, obtaining, from an advertiser, and electronically storing, information specifying a time-spaced sequence of electronic advertisements to be targeted and served,
        wherein each of the advertisements in the sequence is to be served to a user while the user is using a specified different electronic device,
        wherein the sequence as a whole is designed to lead to a particular response from the user,
        wherein the particular response includes an increasing interest leading to an eventual conversion,
        wherein each of the advertisements in the sequence is to be served to the user while the user is using a specified different electronic device of a set of electronic devices, wherein the set of electronic devices comprises a mobile phone, a tablet computer and a desktop computer,
        and wherein each advertisement of the sequence relates to a same product, service, brand, or a same type of product, service, or brand;
    using one or more computers, storing a set of indicators for the user, where each indicator is associated with a distinct advertisement in the sequence, and the indicator shows that the associated advertisement has been viewed by the user; and
    using one or more computers, targeting and serving each of the advertisements in the sequence to the user, wherein each particular advertisement of the sequence is served to the user upon detecting that that the user is using the specified electronic device and the user's indicator associated with the particular advertisement shows that the user has not viewed the particular advertisement, and delivered while the user is using the electronic device specified by the advertiser for the particular advertisement.

* * * * *